July 17, 1973  L. A. KNAVISH ET AL  3,746,527
METHOD AND APPARATUS FOR HOMOGENIZING VISCOUS MOLTEN GLASS
Filed May 20, 1971  2 Sheets-Sheet 1

INVENTORS
LEONARD A. KNAVISH
ARNOLD J. GOLDBERG
WILLIAM G. HILLIARD

BY

ATTORNEYS

United States Patent Office 3,746,527
Patented July 17, 1973

3,746,527
METHOD AND APPARATUS FOR HOMOGENIZING VISCOUS MOLTEN GLASS
Leonard A. Knavish, Pittsburgh, and Arnold J. Goldberg and William G. Hilliard, Lower Burrell, Pa., assignors to PPG Industries, Inc., Pittsburgh, Pa.
Filed May 20, 1971, Ser. No. 145,340
Int. Cl. C03b 5/18
U.S. Cl. 65—136                16 Claims

ABSTRACT OF THE DISCLOSURE

Substances are mixed into liquid flowing viscously in a channel or passage by means of gas-curtain mixer devices of the kind taught in British Pat. No. 1,171,133. Two such devices are used, extending transversely of the channel or passage and at an angle of 10 to 80 degrees with respect to the flow of liquid. The upstream mixer device extends only about 88 to 98.5 percent of the way across the passage or channel; the downstream mixer device extends all the way across the channel. This yields an improved mixing action. The foregoing concept is applied to the mixing of colorant into molten glass traveling in the forehearth of a container-glass tank. This requires particular conditions of the use of the mixer devices with respect to gas-impingement angle, spacing between the devices, and orientation angle of the devices with respect to the flow of the glass.

BACKGROUND OF THE INVENTION

(1) Field of the invention

This invention relates to the mixing of a liquid flowing viscously in a passage or channel. In particular it relates to the mixing of a substance into a liquid such as a molten glass flowing in the forehearth of a container-glass tank.

(2) Description of the prior art

Various patents, such as U.S. Pat. No. 2,115,408 and U.S. Pat. No. 2,817,191, disclose the mixing of colorant material into molten glass flowing in the forehearth of a container-glass tank. In the methods of those patents, the stirring of the glass is done mechanically by means immersed in the glass. This has the drawbacks of high power requirements and in most instances relatively short service life and/or high cost of the glass-immersed stirring element.

British Pat. No. 1,171,133 discloses a gas-curtain mixer device for use in the homogenization of molten glass. Similar devices are also disclosed in Belgian Pat. No. 756,175, issued Mar. 15, 1971, which teaches preferred forms of such mixer devices for enabling hot gases to be fed therethrough, reliably over a long service life. The above-mentioned British patent mentions the use of two or more such mixer devices in tandem if an enhanced mixing effect is desired, but it does not teach the solution, in accordance with the present invention, for the problem of attaining enhanced mixing with mixer devices of this kind, while at the same time maintaining a relatively good throughput rate of viscous liquid being mixed.

The following U.S. patents are concerned with colorant mixing in a container-glass forehearth and disclose colorant materials that may be used in such practice: Nos. 3,523,779; 3,513,003; and 3,498,806.

SUMMARY OF THE INVENTION

In one of its broadest aspects, the instant invention concerns the effective homogenization or the homogeneous mixing of a colorant material into viscously flowing molten glass or other liquid of comparble viscosity, by bringing the liquid into the influence of at least two gas-curtain mixer devices of the kind hereinabove mentioned. The mixing or homogenizing is done under such conditions that the effect of the mixer extends throughout the entire depth of the liquid flowing in the passage under the mixer device, and under conditions such that substantially all of the input liquid to be mixed or homogenized is brought under the influence of at least one of the gas-curtain mixer devices used. In this aspect, the molten glass or the like does not necessarily flow in a channel that is straight and is, apart from the mixer devices, free of obstructions, and in this aspect, it is not necessarily true that there is provided a downstream gas-curtain mixer device that extends in its effect entirely from one side of the channel or passage to the other.

In another aspect, the instant invention involves overcoming the problem of obtaining enhanced mixing action in a liquid flowing viscously and substantially unidirectionally in a passage or channel by means of gas-curtain mixer devices of the general kind indicated in British Pat. No. 1,171,133, while at the same time maintaining a good rate of throughput. In accordance with the invention, the problem as stated broadly above, is solved by using at least two mixer devices, each oriented at an angle of about 10 to 80 degrees with respect to the flow of the liquid in the channel or passage, with the upstream one or ones of the mixer devices extending about 88 to 98.5 percent of the way across the channel or passage and the mixer device most downstream extending entirely across the channel or passage. This makes it possible, with a relatively modest consumption of power in the mixer device or devices upstream, to obtain a thorough-going mixing action, while at the same time allowing much of the throughput to escape through the portion of the channel or passage onto which the gas curtain is not blown. Preferably, the gap so left in the upstream mixer device is at the downstream end thereof, so that the spiraling motion imparted to the liquid by the mixer device is enhanced in its pitch and in its effectiveness by the tendency, resulting from the preferred flow of the liquid through the gap of the downstream end of the mixer device, to accelerate the swirling flow of the liquid in a downstream direction. If three or more such mixing devices are being used, the arrangement thereof to provide, by means of such gaps, a generally zig-zag pattern of preferred flow for the bulk of the throughput, enhances the mixing action.

In a narrower aspect, the instant invention concerns the mixing of a substance into a liquid of high viscosity such as molten glass traveling in the forehearth of the container-glass tank, or the adding of a coloring dye to a mixture of chlorinated biphenyls (a liquid selected for its property of exhibiting at a temperature such as about 78 degrees Fahrenheit a viscosity comparable to that of molten glass). A mixing of this kind presents particular problems that necessitate the use of especial operating conditions and design criteria, if good mixing at an adequate throughput rate is to be achieved. The mixer devices must be oriented when viewed in plan at an angle of 10 to 40 degrees with respect to flow of glass in the channel or passage; the gas-impingement angle for each of the mixer devices must be about 25 to 35 degrees from the vertical in the upstream direction; and the second mixer device must be located downstream of the first by a minimum amount that is arrived at by a vector-sum calculation, as herein taught. These principles apply whether the liquid being mixed is molten glass, chlorinated biphenyls of the kind mentioned above, or any other liquid having a viscosity on the order of 1 to 10,000 poises under the conditions of mixing. When conditions as indicated above are observed, adequate mixing of the material being added into the viscous liquid may be achieved in a time on the order of 1½ to 4 hours at a throughput rate corresponding to a flow of up to about 22.5 tons per day of molten glass passing through a cross-sectional area of one square foot.

DESCRIPTION OF THE DRAWINGS

A complete understanding of the invention may be obtained from the foregoing and following description thereof, taken together with the appended drawings, in which.

DESCRIPTION OF THE PREFERRED EMBODIMENT

Figure 1:
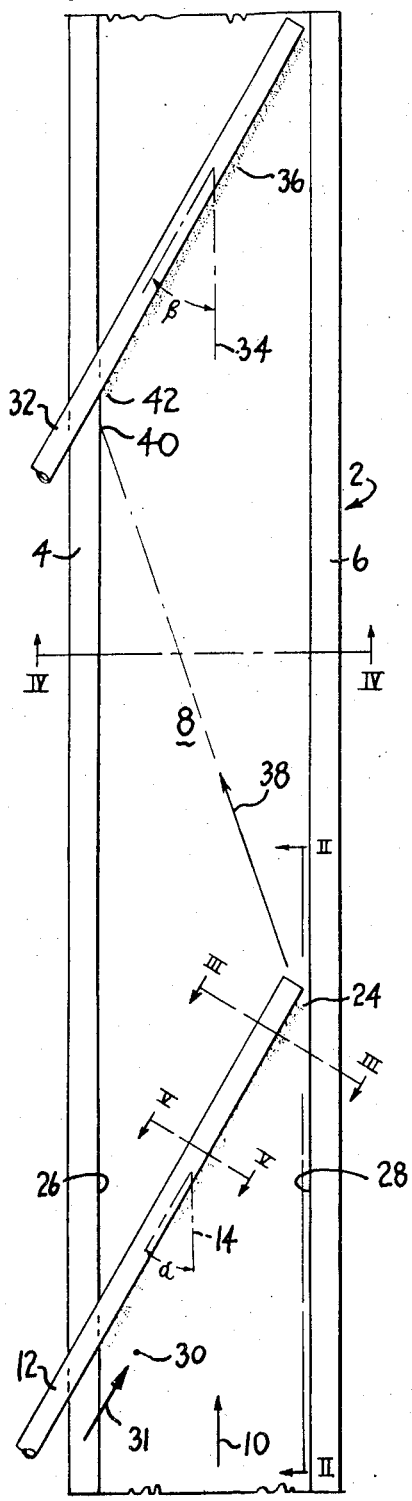
FIG. 1 is a plan view, partly schematic, of a channel provided with mixing devices in accordance with the teachings of the present invention.
Figure 2:
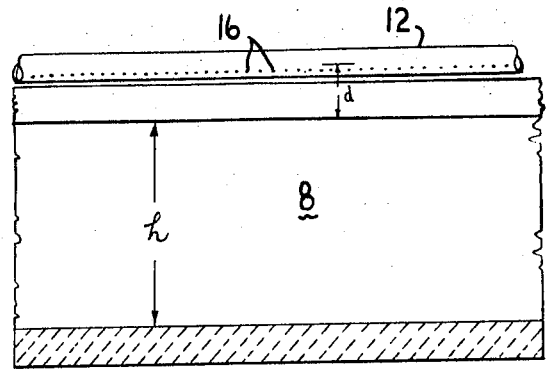
FIG. 2 is a partial elevation view taken on the line II—II of FIG. 1.
Figure 3:
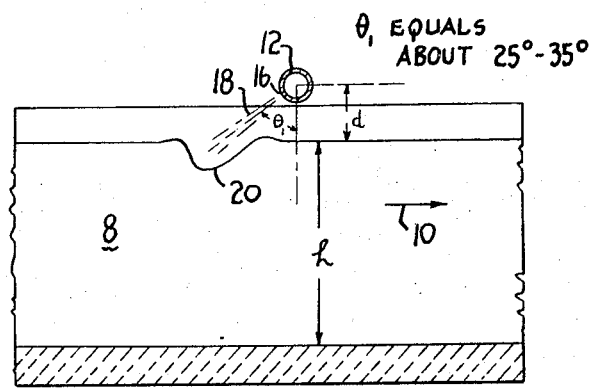
FIG. 3 is an another partial elevation view taken on the line III—III of FIG. 1.
Figure 5:
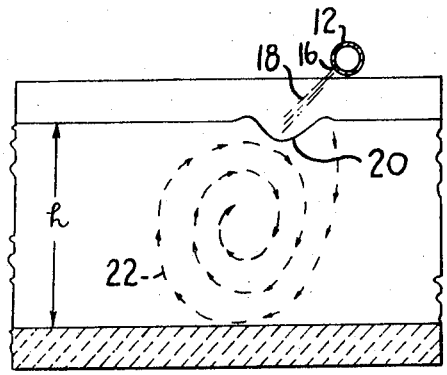
FIG. 5 is still another partial elevation view taken on the line V—V of FIG. 1.
Figure 4:
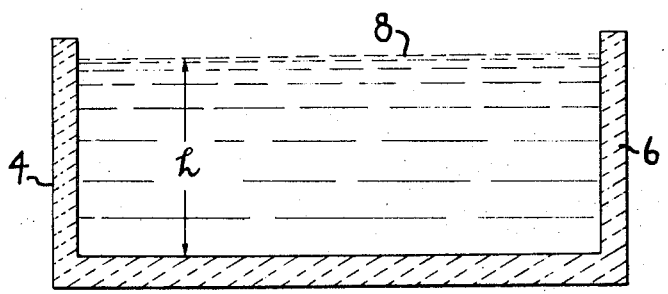
FIG. 4 is yet another partial elevation view taken on the line IV—IV of FIG. 1.

Referring to FIG. 1, there is shown a channel or passage 2 having side walls 4 and 6, within which there flows viscously a liquid 8 (see FIG. 4). The liquid 8 flows in the direction indicated by the arrow 10. A first or upstream mixer device 12 extends over the liquid 8 and is arranged at an angle $\alpha$ when viewed in plan with respect to a line 14 representative of the main flow that the liquid 8 would have if the device 12 were not in operation. As best seen in FIG. 2 the device 12 contains a number of nozzles or openings 16, through which gas is projected onto the surface of the liquid 8. As best seen in FIG. 3, the device 12 projects gas onto the liquid with such force as to cause a visible disruption 20 thereon, and the blast 18 is directed at an angle $\theta_1$ with respect to the vertical, and upstream with respect to the flow indicated by the arrow 10. As seen in FIG. 5, the blast 18 creates throughout the height $h$ of the liquid in the channel or passage 2 a swirling or rotating action as indicated at 22 which establishes a helical or spiraling current of flow of the viscous liquid below the blast 18. The swirling or rotating action thus established alters the flow of the viscous liquid in the channel 2, so as to produce a mixing action.

The mixer device 12 does not extend all of the way across the channel 2. Instead, it terminates, at least as respects its gas-curtain action, at a location 24 that is about 88 to 98.5 percent, preferably 94.9 to 98.3 percent, of the distance from the interior of wall 26 of the channel 2 to the corresponding opposite location 28.

Figure 6:
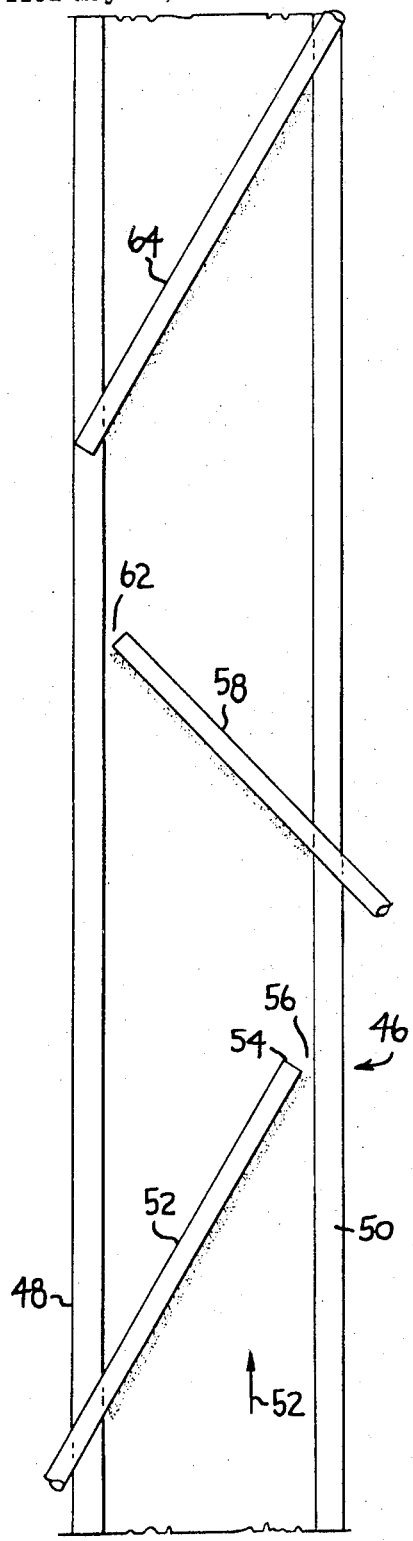
FIG. 6 is a plan view, partly schematic, illustrating a particular feature of the invention in one aspect.

If a colorant or dye or other substance is added to the liquid 8 at a suitable location, such as 30, by means indicated at 31, there is obtained the effect that the device 12 generates a rotating or spiraling flow in its vicinity, impeding the passage of viscous liquid in the area affected by the gas curtain, but inasmuch as the device 12 does not extend all of the way across channel 2, there is left open a gap through which much of the viscous liquid passing through the system preferentially flows. If the device 12 extends entirely across the channel, substantially greater power is required in order to obtain the desired mixing action throughout the height $h$ of liquid 8 in the channel 2 at a given rate of throughput, since the first device 12 must then act as not only a mixer but also a dam. In such case the dammed liquid does not flow as rapidly, and throughput rates are lower. The concept of providing an upstream gas-curtain mixer device that does not entirely obstruct the channel 2 is also useful from the standpoint that, when three or more of such devices are used, it is possible (by leaving the gaps, first near one of the walls 4, and then near the other, in an alternate arrangement) to force the liquid into a generally zig-zig preferential flow pattern and thereby enhance the mixing action. In this regard, attention is directed to FIG. 6, which illustrates this concept. Liquid flows viscously in a channel 46 having side walls 48 and 50 in a direction indicated by the arrow 51. A first gas-curtain mixer device 52 is so arranged that at its downstream end 54 there is a gap 56; a second device 58 is arranged so that at its downstream end 60 there is a gap 62, and there is then a third device 64 that is such that its gas curtain extends in its effect across the entire width of the channel between the walls 48 and 50. Zig-zag preferential flow is effected, in that the bulk of the liquid in the channel 46 flows preferentially first through the gap 56 near the wall 50 and then through the gap 62 near the wall 48. It will be apparent to those skilled in the art that the preferential zig-zag flow pattern indicated above may be suitably extended, as desired, by the use of additional devices (such as the mixer devices 52 and 58), so long as the gaps (such as the gaps 56 and 62) are upon alternate ones of the side walls 48 and 50.

Referring again to FIG. 1, there is provided a second mixer device 32 that is of the kind indicated in British Pat. No. 1,171,133. It is oriented at an angle $\beta$ with respect to the main and undisturbed line of flow 34 of the liquid in the channel, and as is indicated at 36 it produces a gas-curtain that extends substantially entirely from the wall 4 to the wall 6. The gas curtain 36 is directed upstream, at an angle from vertical $\theta_2$ (not shown, but generally corresponding to the angle $\theta_1$ shown in FIG. 3). It is considered essential in accordance with this aspect of the instant invention that the device most downstream produces a gas curtain that fulfills this requirement.

The invention in its narrower aspect, as it relates to the mixing of an additive substance to a liquid of high viscosity such as molten glass or chlorinated biphenyls, will now be disclosed. A model study was conducted, using to simulate the molten glass a mixture of chlorinated biphenyls containing 54 weight percent of chlorine, such as the substance sold by Monsanto Company under the trade name Aroclor. This material has at 100 degrees Fahrenheit a $\log_{10}$ viscosity of 0.98, which corresponds to 1800 to 2500 Universal Saybolt seconds; at 130 degrees Fahrenheit it has a $\log_{10}$ viscosity of 0.006; thus, it provides a viscosity-versus-temperature curve that sufficiently parallels that of molten glass to make the material suitable for this modeling work. As those familiar with the construction and use of models of flow systems will readily appreciate, it is possible, by constructing a system that adequately parallels the conditions that exist in the full-scale system being modeled, to obtain reliable results. We have found that when care is taken to construct a model wherein the parameters used in the model correspond to the full-scale system with respect to the pertinent ones of the relevant dimensionless groups (the Reynolds, Prandtl, and Froude numbers and the like), the results obtained have a high degree of reliability.

In the model studies, several things were learned. When an attempt was made to operate under conditions corresponding closely to the flow of glass in an existing container-glass forehearth, operating with a channel width of 36 inches and a channel depth $h$ of 6 inches and a throughput rate on the order of 45 tons per day, it soon became apparent that adequate mixing could not be achieved with the use of a single device such as the device 12. Moreover, even with two devices the results were unsatisfactory unless the upstream device had a gap that caused the liquid to flow preferentially in the manner described above. Furthermore, it was determined that the mixing action remained unsatisfactory unless the angles $\theta_1$ and $\theta_2$ were kept within the relatively narrow limits of 25 to 35 degrees upstream; trials with downstream angles of $\theta_1$ or $\theta_2$, or smaller upstream angles, did not yield an adequate swirling action, nor did the use of higher upstream angles. Yet another finding was that the angles $\alpha$ and $\beta$ needed to be kept within the limits of 10 to 40 degrees. This is commercially significant in that the overall length of the device such as 12, for a channel 2 of given width, is strongly influenced by the angle $\alpha$ or $\beta$, varying as the cosecant of that angle. At 30 degrees the device 12 needs to be twice as long as the channel is wide, and at 10 degrees, 5.76 times as long. The cost of a device 12 is importantly influenced by its overall length, not only from the standpoint of its greater consumption of material and greater overall weight but also from the consideration that a longer device needs to be constructed more sturdily in order to prevent sagging.

Another finding was the empirical discovery that a minimum spacing needed to be observed between the first device and a second, in order to obtain an adequate mixing effect. Trials under various conditions then revealed that, at least as a fairly reliable rule-of-thumb guide, the minimum spacing required may be determined from a vector-sum calculation. The vector sum that is calculated is that of a first vector, corresponding to the main flow of glass in the channel 2, and a second vector that is the negative of the flow that wold be imparted to the glass if it were otherwise substantially undisturbed but were influenced by the gas-curtain flow emitted from the device 12. The first vector may readily be determined in model studies by a knowledge of the total throughput and the cross-sectional area of the channel 2. The second vector may be determined experimentally, using a dye spot or other suitable marker, while operating the system under such conditions that the device is operating but the main flow of the model liquid is not being caused to occur. The vector sum so obtained (indicated at 38) is used for its direction, not its magnitude, and starting with the point 24 of the device 12 it is possible to proceed in the direction indicated by the resultant vector to a point 40 on the opposite wall 4. The device 32 should not have any part of its gas curtain upstream of the point 40 so found, if the downstream device is to be expected to have its full and proper effect.

The invention explained above will be illustrated by the following specific examples, one of which relates to the addition of dye to chlorinated biphenyls, and the other of which concerns the additions of colored frit material to molten glass traveling in a container-glass forehearth.

EXAMPLE I

Blue dye was mixed into chlorinated biphenyls under conditions indicated below. There was used a channel 12 inches wide with the depth $h$ of the model liquid being 2.67 inches. The channel had an overall length of 8 feet. The model liquid used was "Aroclor 1254." In the model, the liquid was at 78 degrees Fahrenheit, exhibiting a $\log_{10}$ viscosity of 2.05 poises. The throughput rate was 778.5 cubic centimeters per minute. The colorant material used was model liquid mixed with a small proportion of oil blue A organic dye and it was added at 22.5 cubic centimeters per minute. The angle $\alpha$ was 20 degrees and the angle $\beta$ was 30 degrees. The apex 24 of the device 12 was about 8 inches upstream of the point 42. The end 24 of the device 12 was 0.41 inch from the wall 6. Thus, in this case the gap was 3.41 percent of the width of the channel, or in other words, the upstream mixer device extended across 96.59 percent of the width of the channel. The length of the device 12 was about 24 inches. It contained about 144 openings of 0.030 inch diameter spaced on 0.167 inch centers, and air was supplied to the interior of the pipe at a pressure of 30 inches of water. The angle $\theta_1$ was 30 degrees upstream, and the devices 12 and 32 were spaced 0.5 inch from the surface of the model liquid. The device 32 was constructed and operated under conditions substantially the same. Within 100 minutes after the start of colorant addition, a stable condition was achieved, with adequate mixing throughout the width and depth of the model liquid traveling in the channel 2 in the vicinity of its downstream end, and no visible streaking or other evidence of inhomogeneity.

EXAMPLE II

Colored frit is added to glass traveling in the forehearth of a container-glass tank. The channel width is 36 inches, and the glass depth $h$ is 8 inches. The channel length is 24 feet. The glass consists essentially of:

|  | Percent |
| --- | --- |
| Soda and/or potash | 15 |
| Lime and/or magnesia | 12 |
| Alumina | 2 |
| Barium oxide | 0.25 |

Balance substantially silica.

This is a typical soda-lime glass for use in manufacture of containers. The composition of the colorant frit is such as that of U.S. Pat. No. 3,523,779, e.g., that of Example III of that patent.

The glass enters the channel at 2350 degrees Fahrenheit and leaves at 1950 degrees Fahrenheit or 2000 degrees Fahrenheit. The rate of throughput is 45 tons per day and colored frit is added at a rate of about 3 weight percent of the throughput. The angles $\alpha$, $\beta$, $\theta_1$ and $\theta_2$ are the same as in Example I. The device 12 has an overall length of about 6 feet, and is designed in accordance with FIG. 11 of Belgian Pat. No. 756,175, issued Mar. 15, 1971. The apex 24 of the device 12 is spaced from the wall 6 and a distance of 1.23 inches. The device 12 has nozzles that are of ⅛-inch inside diameter, located on ½-inch centers, and to the interior of the device there are fed combustion gases of temperature of about 2150 degrees Fahrenheit such as those formed by the combustion of methane with 50 to 500 percent of excess air. The nozzle-to-glass spacing is 3 inches. The combustion gases are supplied at a manifold pressure of about 135 ounces per square inch gage. After a period of operation of about three hours, a condition of stable and satisfactory mixing is obtained.

Those skilled in the art will understand that the invention is not limited to the mixing of viscous liquids traveling in straight channels or passages. To the extent that a channel or passage is curved, the mixing action is thereby improved, and those skilled in the art will also appreciate that adequate homogenization may, in many instances, be obtained without having a device 12 or 32 that extends the entire width of the channel 2, so long as by other means, such as the inclusion of wedges or baffles or other suitable obstruction, substantially every part of the glass or other matrix liquid is brought into the area of influence of a device like the device 12. Thus, in this aspect the instant invention is to be understood as involving the production of a homogenized highly viscous liquid traveling unidirectionally in a channel or passage by being subjected to the action of a plurality of devices such as the device 12 under conditions that yield mixing throughout the height $h$. The particular conditions disclosed hereinabove merely represent a convenient and reasonably well understood manner of achieving the intended result.

In the making of colored glasses by forehearth colorant addition, the instant invention is not to be considered limited to the use of the particular frit colorant material indicated above. Those skilled in the art will perceive that other colorant oxides may be used, such as those disclosed in such references as U.S. Pat. No. 3,498,806 and U.S. Pat. No. 3,513,003. Solubilizers such as borates or silicates of alkali metals or alkaline-earth metals may be present, and in the instances where iron is present as an impurity, the final glass may contain about 0.0003 weight percent of selenium as a decolorizer. The instant invention is of use whether the colorant added to the glass is intended to be effective with an ordinary annealing schedule in the lehr or the colorant is intended to be brought into effect by changing the annealing schedule so as to "strike" the glass, e.g., in the manner suggested in U.S. Pat. No. 3,513,003. In its aspect of use for forehearth colorant mixing, the instant invention provides adequate mixing at reasonable throughput and without the disadvantages inherent in the use of a member of refractory material that is in physical contact with the molten glass and is agitated or moved to effect the desired mixing—i.e., the disadvantages of high power requirements, short service life, and possible contamination of the product glass.

The throughput is a factor or parameter of considerable importance in the practice of a forehearth colorant-mixing operation in accordance with the instant invention. For a given molten-glass depth and width of channel, there appears to be a maximum throughput rate at which satisfactory mixing can be achieved with the use of two gas-curtain mixing devices, and this is on the order of 22 tons per day per square foot of effective channel cross-sectional area in the zone of mixing. It is accordingly also within the scope of the instant invention to use a forehearth that contains, at least in the region wherein mixing by means of gas-curtain mixer devices of the kind mentioned above is conducted, and possibly throughout the length of the forehearth, a somewhat greater glass depth $h$ than has hitherto been usual, in order that the above-mentioned cross-sectional area may be appropriately increased. The alternative, i.e., the use of a wider channel, though it is in some instances feasible, is in general unattractive because of the consideration that this makes it necessary to increase correspondingly the overall length of the gas-curtain mixer devices, with consequent greater costs. Still another alternative is to use three or more gas-curtain mixer devices. In one model trial with three devices, satisfactory mixing was obtained at a throughput rate corresponding to 40 tons per day per square foot of cross section.

The invention in its broadest aspect (use of at least two long-service gas-curtain mixer devices operating in their effect upon glass through the depth of the glass in the channel or passage and under conditions such that substantially all of said glass is subjected to a homogenizing action by virtue of the operation of such gas-curtain mixer devices) serves for the mixing of colorant materials into molten glass that is traveling substantially unidirectionally in a channel or passage that is not straight and/or that contains one or more obstructions. It is hardly feasible or desirable to provide directions or illustrations for the practice of the invention in this broad aspect, since the conditions to be used may be varied in so many different ways, but it is possible to state that the selection of appropriate dimensions, conditions, locations and other parameters may perhaps most conveniently be made as the result of model studies appropriately conducted along the lines hereinabove indicated. The specific examples contained herein relate in fact to perhaps the most difficult case—i.e., the use of only two mixing devices, no wedges or other diverting physical obstructions in contact with the glass, and a straight channel. Those skilled in the art will perceive that by model studies there well may be found other sets of conditions whereby, with the use of two or more gas-curtain mixer devices operating upon the molten glass traveling in a passage as hereinabove indicated, there may be brought to the art of forehearth glass-colorant mixing the advantages of non-contact thorough stirring at satisfactory throughput rates, whether or not the arrangement necessarily includes a downstream device traversing the entire passage or channel and an upstream device that leaves a small gap through which the bulk of the throughput of molten glass is caused preferentially to flow.

The utilization, however, of the downstream-across, upstream-gap concept facilitates the achievement of desired conditions, and the further concept of locating the downstream device in accordance with the vector-sum calculation hereinabove explained is yet another valuable contribution to the art that still further facilitates the achievement of desired results by tending to ensure efficient use of the downstream device with minimum overall channel length.

Indeed, the throughput is related to various others of the parameters—channel width and depth, viscosity of the liquid, and pressure used in the gas-curtain mixing devicees. The effectiveness of the mixing action depends upon the absolute values and the correlation of these parameters. With respect to absolute values, it is surely possible to have a channel or liquid depth too great for mixing to be done, or a liquid of such high or low viscosity that it is impossible to practice the invention, or a gas-curtain mixer manifold pressure so low that it is ineffectual or so high that it introduces unwanted bubbles or other defects or causes other problems. Indeed, prior to the instant invention, it was not obvious that with respect to the mixing of molten glass at forehearth temperatures there would exist any combination of parameters that would yield adequate mixing with channel dimensions and throughput rates of commercial reasonableness. We have discovered, however, that such a set of conditions or parameters does exist, and that it is not so nearly unique as to require extremely close control of process conditions. We have discovered, however, that the conditions are more exacting and somewhat more costly to implement than we had at first hoped; in this regard, the angles $\alpha$ and $\beta$ come to mind.

It turns out, in connection with the mixing of colorant material into molten glass in a forehearth, that the manifold pressure used in the gas-curtain mixer device needs to be somewhat greater than any pressure that has hitherto been used long-term with success when such devices were employed in the making of window glass. In that application it has been usual to use manifold pressures on the order of 90 to 115 ounces per square inch gage, 105 ounces per square inch gage being a typical value. With higher manifold pressures, the glass tends to develop seeds, blisters and/or "ream." In contrast, the above Example II cites a manifold pressure of 135 ounces per square inch gage, and the use of such a greater manifold pressure appears necessary. It is doubtful that an adequate mixing effect can be obtained with as little as 120 ounces per square inch gage.

The relation of the viscosity of the liquid to the other parameters deserves some explanation. If liquid has too low a viscosity, its molecules slip over one another so easily that spiraling or swirling motion, and mixing in depth, are not obtained; if the liquid has too high a viscosity, the forces required to cause it to circulate tend to become too great, so that the manifold pressures required for a mixing throughout the depth become intolerably great. It may be considered that there is an ideal combination of depth $h$, viscosity, and manifold pressure such that there is enough viscous coupling in the liquid to generate a swirl or helix that tangentially contacts the bottom of the passage; less pressure, giving a swirl less deep, does not give adequate mixing, and though using more pressure (within limits) is not inoperative, there is no substantial benefit justifying the cost of such practice.

In view of the foregoing, perhaps the most satisfactory teaching that can be advanced concerning the interactions of throughput, depth $h$, viscosity, and manifold pressure is to state, for molten soda-lime glass in the forehearth of a container-glass tank, a set of ranges for these parameters, indicating that Example II hereinabove provides one operable set of conditions and those skilled in the art will understand how, from the foregoing discussion, if one of the parameters is to be changed, an appropriate other one or the appropriate other ones should be changed to obtain satisfactory results. To that end, we teach using a depth $h$ of 4 to 10 inches, a throughput of not more than about 25 tons per day per square foot of cross-sectional area transversely to the flow of the glass in the zone of mixing, a manifold pressure of 125 to 165 ounces per square inch gage and a viscosity of the glass equal to that of soda-lime container glass at 2400 degrees Fahrenheit to 1900 degrees Fahrenheit.

Yet another teaching noteworthy in connection with the instant invention is that it does not, in the broadest aspect of the invention, make any difference where the gap in an upstream gas-curtain mixer device is; it may be at the end thereof most downstream, or the end thereof most upstream, or somewhere in between. To get mixing throughout the depth without undue gas-curtain mixer-device manifold pressure, there must be a gap, but it does not matter, in principle, where it is, so long as there is some place through which the bulk of the liquid involved may preferentially flow. On the other hand, the length of time that it takes to reach a stable condition of satisfactory mixing may well be influenced by the selection of the location of the gap in the upstream gas-curtain mixer device. If the gap is at the upstream end thereof, there is a tendency for the colorant material to gather, in effect, in a "pocket" upstream of the device, until that pocket is substantially full. On the other hand, the mixing proceeds more rapidly to a stable state if the gap in the upstream gas-curtain mixer device is at the downstream end thereof, since in that event there is no chance for such a pocket to form.

We claim:

1. An apparatus for homogenizing a viscous liquid having a viscosity of from 1 to 10,000 poises or distributing substantially therethrough a substance which has been added to said viscous liquid comprising:
   a channel including spaced side walls and a bottom which provide a space through which said viscous liquid is free to flow along a path extending the length of said channel,
   at least one gas conduit mounted above the surface of the viscous liquid flowing in said channel, each of said gas conduits being positioned so as to extend at an angle with respect to and in the direction of the path of flow of said viscous liquid, each of said gas conduits being provided with at least one outlet overlying the surface of said viscous liquid, said outlet in each of said conduits being disposed therein so as to direct a curtain of gas upon the underlying surface of said viscous liquid in a direction upstream with respect to the path of flow of said viscous liquid and at an angle to the vertical such that the force of said gas curtain upon the surface of said viscous liquid distorts said surface and establishes a helical current flow below the surface of the viscous liquid underlying said outlet, the gas conduit furthermost upstream of the flowing viscous liquid being provided with an outlet extending from a first side wall to a location spaced a short distance from the opposing second side wall of said channel,
   whereby the flow of said viscous liquid through said channel is altered by said helical current of flow so as to produce a mixing of the viscous liquid in the region where said flows meet.

2. The apparatus of claim 1 wherein each gas conduit is positioned at an angle of from 10 to 40 degrees with respect to and in the direction of flow of said viscous liquid.

3. The apparatus of claim 1 wherein the angle from the vertical of the curtain of gas from the outlet in each said conduit is from 25 to 35 degrees.

4. The apparatus of claim 1 wherein the outlet in the gas conduit furthermost upstream of the flowing viscous liquid extends from said first side wall about 88 to 98.5 percent of the distance between said first and second side walls in the direction of said gas conduit so as to provide a gap through which the mixed viscous liquid may pass and thereafter flow toward said first side wall.

5. The apparatus of claim 4 wherein the gas conduit extending from the first side wall at a location downstream from said conduit furthermost upstream is positioned at a point at or downstream from the point on said first side wall whereat the flow of viscous liquid from said gap meets said first side wall.

6. An apparatus for homogenizing a viscous liquid having a viscosity of from 1 to 10,000 poises or distributing substantially uniformly therethrough a substance which has been added to said viscous liquid, comprising:
   a channel including spaced side walls and a bottom which provide a space through which said viscous liquid is free to flow along a path extending the length of said channel,
   a first gas conduit mounted above the surface of the viscous liquid flowing in said channel, said gas conduit being positioned so as to extend at an angle with respect to and in the direction of the path of flow of said viscous liquid, said gas conduit being provided with at least one outlet overlying the surface of said viscous liquid and extending from a first side wall to a location spaced a short distance from the opposing second side wall,
   said outlet being disposed in said conduit so as to direct a curtain of gas upon the underlying surface of said viscous liquid in a direction upstream with respect to the path of flow of said viscous liquid and at an angle to the vertical such that the force of said gas curtain upon the surface of said viscous liquid distorts said surface and establishes a helical current of flow below the surface of the viscous liquid underlying said outlet, and
   a second gas conduit mounted above the surface of the viscous liquid flowing in said channel, downstream with respect to said first gas conduit said second gas conduit being positioned so as to extend at an angle with respect to and in the direction of the path of flow of said liquid, said second gas conduit being provided with at least one outlet overlying the surface of said viscous liquid and extending from said first side wall to said opposing second side wall, said outlet being disposed in said second gas conduit so as to direct a curtain of gas upon the underlying surface of said viscous liquid in a direction upstream with respect to the path of flow of said viscous liquid and at an angle to the vertical such that the force of said gas curtain upon the surface of said viscous liquid distorts said surface and establishes a helical current of flow below the surface of the viscous liquid underlying said outlet.

7. The apparatus of claim 6 wherein each of said gas conduits is positioned at an angle of from 10 to 40 degrees with respect to and in the direction of flow of said viscous liquid.

8. The apparatus of claim 6 wherein the angle from the vertical of the curtain of gas from the outlet in each said conduit is from 25 to 35 degrees.

9. The apparatus of claim 6 wherein each of said gas conduits is positioned at an angle of from 10 to 40 degrees with respect to and in the direction of flow of said viscous liquid, and the angle from the vertical of the curtain of gas from the outlet in each of said conduit is from 25 to 35 degrees.

10. The apparatus of claim 6 wherein the outlet in said first gas conduit extends from said first side wall about 88 to 98.5 percent of the distance between said first and second side walls in the direction of said gas conduit so as to provide a gap through which the mixed viscous liquid may pass and thereafter flow toward a location on said first side wall at or in advance upstream of said second gas conduit.

11. The apparatus of claim 10 wherein the outlet in said first gas conduit extends from said first side wall about 94.9 to 98.3 percent of the distance between said first and second side walls in the direction of said gas conduit.

12. The apparatus of claim 6 wherein a third gas conduit is mounted above the surface of the viscous liquid flowing in said channel at a location intermediate said first and second gas conduits, said third gas conduit being positioned so as to extend at an angle with respect to and in the direction of the path of flow of said viscous liquid, said third gas conduit being provided with at least one outlet overlying the surface of said viscous liquid and extending from said second side wall to a location spaced a short distance from the opposing first side wall, said outlet being disposed in said third conduit so to direct a curtain of gas upon the underlying surface of said viscous liquid in a direction upstream with respect to the path of flow of said viscous liquid and at an angle to the vertical such that the force of said gas curtain upon the surface of said viscous liquid distorts said surface and establishes a helical current of flow below the surface of the viscous liquid underlying said outlet.

13. The apparatus of claim 12 wherein the outlet in said third gas conduit extends from said second side wall about 88 to 98.5 percent of the distance between said second and first side walls in the direction of said third gas conduit so as to provide a gap through which the mixed viscous liquid may pass, said third gas conduit being positioned at an angle of from 10 to 40 degrees with respect to and in the direction of flow of said viscous liquid, and the angle from the vertical of the curtain of gas from the outlet in said third conduit is from 25 to 35 degrees.

14. A method of homogenizing a viscous liquid having a viscosity of from 1 to 10,000 poises or distributing substantially uniformly therethrough a substance which has been added to said viscous liquid comprisnig the steps of:

flowing a stream of substantial depth of said viscous liquid along an elongated path of flow, applying at least one stream of gas in the form of a gas curtain to the surface of the flowing stream of viscous liquid, each of said gas curtains being disposed at an angle with respect to and in the direction of the path of flow of said stream of viscous liquid and directed upon the underlying surface of said flowing stream of viscous liquid at an angle extending toward the upstream direction of the path of flow of said stream of viscous liquid, the gas curtain furthermost upstream of the path of flow of said viscous liquid being of a length such that it extends from one edge of the stream to a location a short distance inwardly of the other edge of said stream so as to provide a portion of said flowing stream disposed outwardly of the terminus of said gas curtain, said gas curtains each being applied at a force sufficient to distort the underlying surface of said flowing stream of viscous liquid and establish a helical current of flow below the surface of viscous liquid in a region underlying the portion of said flowing stream of viscous liquid distorted by each said gas curtain, whereby the path of flow of the stream of viscous liquid is altered by said helical current of flow so as to effect a mixing of said viscous liquid where said flows meet.

15. The method of claim 14 wherein the viscous liquid is molten glass and each of said gas curtains is disposed at an angle of from 10 to 40 degrees with respect to and in the direction flow of said stream of molten glass and directed at an angle of from 25 to 35 degrees extending toward the upstream direction of the path of flow of said stream of molten glass.

16. The method of claim 15 wherein the flow of mixed molten glass flowing in the portion of the stream of flowing molten glass disposed outwardly from the terminus of said gas curtain furthermost upstream flows to location at the opposite edge of said stream of flowing molten glass and the next stream of gas in the form of a gas curtain is applied across the full width of said stream at or beyond the location at said opposite edge to which said mixed molten glass flows.

References Cited

UNITED STATES PATENTS 3,297,423 1/1967 Prislan _____ 65—347 X
3,224,857 12/1965 Allman et al. _____ 65—134 X

FOREIGN PATENTS 1,171,133 11/1969 Great Britain.

ARTHUR D. KELLOGG, Primary Examiner

U.S. Cl. X.R.

65—178, 347

UNITED STATES PATENT OFFICE
CERTIFICATE OF CORRECTION

Patent No. 3,746,527  Dated  July 17, 1973

Inventor(s)  Leonard A. Knavish et al.

It is certified that error appears in the above-identified patent and that said Letters Patent are hereby corrected as shown below:

Claim 9, column 10, line 59, "each of said conduit" should be
--each said conduit--.

Claim 12, column 11, line 10, "so to direct" should be
--so as to direct--.

Claim 14, column 11, line 32, "comprisnig" should be  --comprising--.

Signed and sealed this 12th day of March 1974.

(SEAL)
Attest:

EDWARD M. FLETCHER, JR.          C. MARSHALL DANN
Attesting Officer                Commissioner of Patents